Reissued Aug. 31, 1954

Re. 23,861

UNITED STATES PATENT OFFICE 23,861

CLADDING METAL

Erith T. Clayton, Baltimore, Md., assignor, by mesne assignments, to Peen Plate, Inc., Baltimore, Md., a corporation of Maryland No Drawing. Original No. 2,640,002, dated May 26, 1953, Serial No. 221,535, April 17, 1951. Application for reissue April 29, 1954, Serial No. 426,621

14 Claims. (Cl. 117—109)

Matter enclosed in heavy brackets [ ] appears in the original patent but forms no part of this reissue specification; matter printed in italics indicates the additions made by reissue.

This invention relates to the art of metal plating, and is a continuation in part for my U. S. applications No. 3,537 filed January 21, 1948, No. 14,639 filed March 12, 1948, No. 77,269 filed February 18, 1949 and No. 99,567 filed June 16, 1949 (Nos. 14,639 and 77,269 having been abandoned). Specifically it relates to the art of surfacing one metal with another in which a metallic coating is built up of small particles of the coating metal deposited on the base surface and overlaid with similar deposits of particles interfitted in metal to metal contact whereby a dense metal coating is incrementally built up, without the employment of either externally applied melting or electricity.

An object of the invention is to provide a metallic coating which is effectively adherent to the base; is inexpensive in application, attractive in appearance, and protective against weather.

Another object is to provide means whereby metals difficult or impossible to plate by more conventional methods, may be successfully plated on all types of metal surfaces including such refractory and difficult surfaces as magnesium. The use of this method permits multiple or layer coats of different metals to be deposited on the surfaces of objects.

The invention thus relates to a method of mechanically plating aluminum, zinc, copper, cadmium, tin, lead, titanium, gold, silver, alloys or mixtures thereof and stainless and other steel alloys or mixtures thereof and other metals on surfaces, articles and objects.

A further purpose of this invention is to provide a simple means for applying alloy coatings.

Basically this invention utilizes the application of mechanical forces to very small particles of metal. These forces are sufficient to suddenly and dractically distort each metal particle beyond its elastic limits. The metal particles used in the operation may be particles of a metal dust made either by condensation from a vapor or by air disintegration of the molten metal, or by other means. In every case, however, natural laws operate to produce particles having a minimum surface area. Thus, the metal particles are round or pear shaped, and the major part of their mass is in the interior. When such a particle having a minimum surface area is acted upon by forces sufficient to suddenly drastically distort and flatten it, its surface area is greatly increased, and metal previously contained on the inside of each particle becomes a part of the surface. If such a particle is flattened in contact with or against a similar particle, and clean metal surface is brought into intimate contact with clean metal of the adjacent particles which has also been distorted, then seizing or welding of the clean surfaces in metal to metal contact with each other ensues. Locally generated heat at the moment of impact is theoretically very large and assists in the promotion of the weld or fusion of the two particles.

In the build up of metallic coatings using this method, two cases arise. The first is the adhesive bond or deposition of the initial or covering layer of particles onto the metal base, and the second is the cohesive bond or deposition of subsequent layers of particles onto those previously deposited. In the first case the surface to be coated is usually a hard massive surface, frequently of steel or other equally hard metal. Forces sufficient to drastically distort and filatten a very small particle may be relatively ineffective in producing any appreciable distortion of the massive base. Hence, only one member in the mating of these surfaces is distorted and consequently to increase the adherence the surface to be coated is slightly etched to present an irregular surface full of microscopic cracks and protuberances so that the coating metal may be plastically deformed by the applied forces into and around these surface irregularities; the clean metal surfaces exposed by the etching and by the deformation of the coating particles uniting to form a strong adhesive bond. The surface roughness of the metal base may be achieved by acid pickling, grit blasting, abrasive tumbling or other means calculated to provide either a microscopically or macroscopically rough, chemically clean, active surface.

The application of forces sufficiently great to suddenly and dractically distort a particle when in contact with the base, upsets the normal atomic arrangement and imparts a very high energy level to the particle whereby atomic mobility is greatly increased, and diffusion of the atoms of the two surfaces joined in this way one into the other occurs and an atomic bond is created. It will be apparent that under the right conditions an infinitely thin metal coating may be rubbed or smeared into the surface cracks and irregularities of another metal to provide an infinitely thin coating. Such coatings are usually completely adherent, but are so thin that they provide little or no protection against corrosion, or, at best, they are suitable only for indoor or temporary use. Smear coatings laid down in this manner, while not common, are not new, but are old in the art. They are usually achieved by dry tumbling in a barrel, but could equally well, under certain conditions, be laid down using a wet technique.

The build up of particles onto and over this initially deposited layer constitutes the cohesive bond in which subsequent layers of particles are laid down, distorted and interfitted into place to build up the coating until the desired thickness is achieved.

The method, whereby a satisfactory cohesive bond of small metal particles to one another, is applied to, and correlated with the adhesive bond of the particles to the base, to form a coating of any desired thickness permanently united to the base is new, and constitutes the basis of the invention.

It is clear that a multiplicity of impacts on the base article sufficient to distort metal particles in contact with it, must exert a substantial scrubbing abrading force tending to tear off protuberances and to smooth and polish the article. For example, if the article to be plated is agitated in a ball mill with a hard abrasive substance, such as crushed iron shot, and a metal dust, and a liquid, the effect of the tumbling action would be to grind the metal dust and to polish or burnish and smooth the surface of the article. This would be especially true if the metal dust had filled in all surface irregularities of the base which would then present a perfectly smooth surface. That this does in fact occur is well known and tumbling barrels have been used for many years for burnishing, deburring and polishing. This burnishing is done both wet and dry and various soaps, wetting agents, and other detergents are used to assist the tumbling action to achieve a higher polish or greater smoothness.

Thus, the provision of impacts necessary to distort the metal particles carries with it a burnishing or deplating action which, in the past, has served to bar any further progress in the field of mechanically applied coatings other than may be achieved by the smeared type, just discussed, which is deposited into surface irregularities of the base. I have discovered that the character of the rubbing, abrading or impacting force must be modified as a necessary preliminary to the build up of thick cohesive coatings in admixture with liquids. This modification may best be secured in a most surprising and unexpected manner, namely, by filming the surfaces of the articles, the metal dust and the impacting medium with a molecularly thin film of certain gummy, oily or fatty substances. It is rather extraordinary that plating in admixture with liquids can best be promoted by the use of what would apear to be the substance most likely to prevent plating. The whole art and science of lubrication is based on the necessity of keeping mating metal surfaces apart by interposing a film of lubricant.

On the other hand, in the complete absence of all films the ability of clean metal surfaces brought into intimate contact to seize or weld is well known. It applies in greater or less degree to all metal surfaces and to many other types of surfaces as well. A familiar example of this is the seizing of an automotive engine when lubrication fails.

Films of one sort or another are invariably present on surfaces. In the case of metals, the films may be composed of decomposition products of the metal, such as oxides, carbonates, sulphates, etc. Metals in common with other surfaces in air or liquid are encased in a thin, gaseous or liquid lamellar viscous envelope. To illustrate, the heat losses incurred in passing heat across a metal surface are known to occur for the most part in this envelope and not in the metal itself.

For the build up of metallic coatings through the incremental sintering into place of small particles, I find these naturally occurring films that exist on the surfaces of the metal dust particles used in the process are objectionable and interfere with plating and must be removed. While it is true that the action of the mechanical forces used to distort the particles may serve to scour and clean the surface of the particles, in an ordinary liquid or gaseous environment, such films constantly reform.

I find, as has been stated above, that the most satisfactory way of removing undesirable films and ensuring that they stay removed, is to use a film former which displaces unwanted films and replaces them with films of a suitable kind which may later be parted or squeezed out from between mating particles in the coating. The film former reagent used to allow plating must therefore have very strong film forming properties of its own to enable it to displace other tightly, adherent films. It should preferably have a solvent action on metal oxides, and it should be present on the metal particles in the form of a very thin, more or less, mono-molecular layer so that it may be easily parted by applied distorted forces. It is best present in a sufficiently thin layer so as not to film over new metal surfaces created by the increase in surface area of the particle as discussed previously.

In general, these film forming materials consist of organic surface active agents having polar molecules. Specifically those materials having both a hydrophilic or water accepting group, and a hydrophobic or water rejecting group in the molecule, are especially suitable. The hydrophobic end attaches itself to the metal surfaces in the plating bath which are thereby completely filmed. Non-ionic or cationic substances are more effective in promoting plating than do the anionics. Non-ionic materials have the further advantage that they may be used in conjunction with either cationic or anionic materials and they are usually sufficiently stable that they may be used in either acidic or basic media. The ability of cationic oil emulsions to completely exhaust themselves onto the surfaces of metals in liquids has been established. This property aids in keeping the quantity of plating promoter at a minimum. Besides being good film formers, the ideal plating promoters should be good wetting agents; they should be good detergents to assist the tumbling action in removing unwanted oxide or other films.

Preferably, the plating catalysts should be poor electrolytes, as the presence of ionisable inorganic salts at the metallic inter-faces of different metals, such as zinc and iron sets up galvanic side effects. Inclusions of this sort, that are retained in the coating, serve as foci of attack, with resultant corrosion, especially where the fluxing material exhibits any hygroscopic qualities.

Preferably, the plating catalysts should be beneficial when retained in the coating in the form of minute occlusions. Thus, they may be corrosion inhibiting and tarnish resisting. There are a great number of materials available that exhibit these properties in greater or lesser degree. I find that different plating promoters profoundly affect the adhesive and cohesive bond, the rate of plating, the thickness of coat achievable, the brightness and smoothness of the deposit and, that this is especially true when the plating promoter is dissolved or dispersed in water.

I do not wish to be limited to any theory as to why different plating promoters should have such a vital effect on adhesion, rate of plating, etc., but it is probably a function of minute inclusions retained in the coating, the effectiveness of the detergent action, the strength, thickness and character of the film on the metal surfaces, and the viscosity of the solution. Since there are many types of film formers that will allow plating to occur under proper mechanical conditions, a selection of one to give the best adhesion, most rapid plating, etc., has required a tremendous amount of experimentation.

I find that the fatty acids, as a class, are especially suitable. All of the fatty acids, when dissolved or dispersed in a suitable carrier, are effective either alone or in combination with other film formers. For example, the acid can be derived from fats or tallow, vegetable, marine or organic oils, as for instance, linoleic acid, linolenic acid, oleic acid, cluponadonic acid, the fatty acids derived from rapeseed, linseed, flax seed, palm, and soya beans. In general, any of the unsaturated monobasic fatty acids of the series $C_nH_{2n}—2O_2$ may be utilized. Of the fatty acids the low molecular weight saturated acids, such as caproic, caprylic and capric are particularly effective, but the long chain unsaturated acids, such as oleic, linoleic or ricinoleic are extremely good. When used in water, the fatty acids require an emulsifying or solubilizing agent as will be described later. A great many compounds derived from fatty acids, such as products of the reaction of fatty acids with ammonia; such as fatty acid amides, fatty acid amines, are particularly suitable for promoting plating as are the fatty acid salts, such as the acetates. Where water is used to carry and dissolve the plating promoter, the various gums, such as sodium, carboxy methyl cellulose, and the natural gums, such as acacia, are very effective particularly when used in conjunction with an organic carboxylic acid or ammonia. Still other types of organic acids may be used. Such acids, for example, may be tartaric acid or oxalic acid or one of the amino acids such as glycine. I have also found that the metal soaps such as zinc linoleate or zinc oleate may function as better plating agents.

In as much as these organic films are usually of the order of one or more molecules in thickness, the film former or plating promoter may be used in very small quantities despite the enormous surface area of the metal dust to be coated. This means that these film formers or plating catalysts, or promoters, must be dissolved or suspended, or otherwise carried in some other liquid which thus serves as a carrier or suspender liquid, the principal function of which is to distribute the film formers or catalysts over the metal surfaces.

The carrier liquid in which the organic surface active film former is carried may be any liquid of suitable viscosity and physical characteristics, inert to the plating promoter, capable of dissolving or otherwise dispersing the surface active agent. For example, the carrier liquid may be any of the group consisting of water, hydrocarbon solvents, aromatic solvents, coal tar derivatives such as xylol naphtha, mineral spirits, toluol, alcohols, ketones, esters, ethers, organic phosphates, organic oils, many plasticisers, etc. etc. The carrier liquid selected to carry the plating promoter or catalyst determines the category or division in which plating occurs. These divisions are the aqueous system and the non-aqueous system.

Dealing first with the aqueous system, and considering a practical application of the invention, the plating may be done by tumbling in a ball mill. The articles to be plated which may, for example, be nails, brads, tacks, screws, bolts, nuts, small hardware, poleline hardware, small stampings, forgings or machine parts, are given a suitable cleaning treatment such as an acid pickle. They are well washed and added, while still wet, to the ball mill, tumbling barrel, or other agitating device. The impacting material used for hammering or impacting the coating onto the articles may be crushed iron shot, small balls, shot, nail clippings, coarse metal dust, or, in the case of small articles like tacks, they may serve as their own impacting material. A very satisfactory mixture is five parts, by weight, of powdered metal to four parts, by weight, of liquid. I have found, however, that this range can vary from seven parts powdered metal to one part liquid and one part powdered metal to four parts liquid and still produce satisfactory results.

This hard material is added to the mill together with fine metal dust which will serve as a raw material from which the coating is built up. The plating chemicals are then dissolved, dispersed or suitably emulsified in water, and this liquid is added to the mill. The mill is closed and rotated and a substantial adherent coating will be built up on the surfaces of the articles. The plating promoters used with water are extremely important. The water functions only as a carrier liquid to disperse and distribute the active promoters over the metal surfaces. Water by itself is harmful. For example, agitation of very fine aluminum dust or very fine zinc dust in plain water in a sealed mill leads to the production of substantial pressures through hydrogen evolution caused by reduction of the water. Moreover, there is nothing present in plain water by itself to assist in the chemical cleansing of meal surfaces. Any effect is exerted in directly the opposite direction; the water supplying oxygen under ideal oxidative conditions. Water alone is thus typical of carrier liquids—it adds nothing to the promotion of plating, but may be detrimental. The action of the film former in filming the metal surfaces serves to insulate them from the water and no attack by the water on the metal occurs. With a suitable selection of plating promoters it is possible to operate in closed and hermetically sealed mills using water and such reactive metals as magnesium, but no gas is generated; but rather a vacuum is created.

The magnitude of the distortive forces applied to the metal dust particles may be regulated by the type and quantity of hard impacting material used, the quantity of cushioning fine metal dust used, and by the size of the mill which in turn requires regulation of the amount of free space or free fall of the charge, and by the concentration and type of film former used as well as by the viscosity and physical characteristics of the carrier liquid—in this case water. The adjustment of these variables can readily be illustrated by examples which will follow, and which show the wide limits possible in the mechanical proportioning of the charges.

By proper balance of the different factors involved, a viscous solution heavily loaded with fine metal dust may counteract the effect of a mill loading which might otherwise be too abrasive in its action. Similarly, very powerful and rapid plating promoters may function well in a mechanical loading which would be unsatisfactory if poor plating promoters were used. The examples again will serve to illustrate the adaptability and tolerances possible in the practical application of the process.

In the non-aqueous system of plating, in which the carrier liquid is something other than water, a number of major and very important changes may be made. To illustrate, the excellent solubility of the fatty acids and many of their important derivatives in solvents, such as alcohol, hydrocarbons, coal tars, etc., makes it possible to eliminate couplers, emulsifiers, or other agents usually necessary when using fatty acids in water.

A non-aqueous system may be operated at temperatures substantially below the freezing point. In the plating of certain articles the use of water is sometimes inadvisable, especially where every trace of water must subsequently be removed. For example, the insides of metal propeller blades for aircraft. The use of non-aqueous systems is occasionally of value where complete and rapid drying is required. The high solubility and inert characteristics of many non-aqueous systems lend themselves to the use of simpler types of film formers and to continuous operation. The highly reactive nature of water, when in contact with fine metal powders, is not as suitable for continuous cyclical operation of the process as non-aqueous liquids where the plating efficiency of water may fall off rapidly after a number of recycles, due to the accumulation of hydroxides and other decomposition products; non-aqueous baths can be kept in operation for prolonged or indefinite periods of time by the adoption of proper physical and temperature conditions, and the selection of suitable plating promoters. In such continuous operation, fresh metal dust and fresh plating promoters must be added to replace losses due to dragout and plated on the articles. Under proper conditions it is possible to plate batch after batch of articles using the same liquids.

I have found that whereas a fatty acid, such as caprylic, in a solvent, such as mineral spirits, may become inoperative if continued in use for prolonged periods, the same mixture will continue to plate if the temperature is raised to approximately 165° F. Articles plated under such conditions have a remarkable luster when removed from the mill, and are astonishingly tarnish resistant; so much so that pieces plated under the above conditions have retained almost all of their original luster for periods exceeding one year when stored in open containers in air. This luster retention and tarnish resistance appears to be especially pronounced in the case of non-aqueous plating, and is apparently due to the retention of minute amounts of fatty acid in the coating.

Organic alkalis, such as the fatty acid amines, have been found to be particularly useful in continuous cyclical operation of the process where batch after batch of articles are processed, using the same liquid. Of these organic fatty amines, I find the tertiary amine of a long chain fatty acid to be particularly effective. For example, if R represents the carbon chain corresponding to the fatty acid, then the primary amine is $RNH_2$ in which one of the hydrogen ions of the ammonia has been replaced with an alkyl radical. Where two or three of the hydrogen ions are replaced, the amine becomes a secondary or tertiary amine respectively.

A preferred primary amine is one derived from a soya base and has the following approximate composition: hexadecyl, 10 per cent; octadecyl, 10 per cent; octadecenyl, 35 per cent and octadecadienyl, 45 per cent. A tertiary amine derived from this primary amine is obtained by condensing ethylene oxide with the primary amine.

Since the amines are alkaline, they may be reacted with other fatty acids or with organic or inorganic acids to produce neutral salts. For example, the amine acetate formed by reacting the amine with acetic acid, has the desired characteristics for plating.

The amines are another type of aliphatic carboxylic derivative which produce satisfactory results. The primary amide as used in my method is defined as the derivative of an organic acid in which an amino group replace the OH group. Therefore, using R as before, a primary amide is $RCONH_2$.

The secondary and tertiary amides are particularly useful in both aqueous and non-aqueous plating baths. The tertiary amide which is a N-substituted fatty acid amide; the substituents being polyoxyethylene groups, is especially desirable, particularly when highly substituted. It is a water soluble, chemically neutral, rather unreactive, film forming, oily material that is especially desirable in combination with fatty acids. In water it functions as a solubilizer or coupler for the acid. These tertiary amides and amines are particularly effective in non-aqueous liquids for continuous cyclical plating in which the bath is kept in operation for weeks at a time by the addition of fresh metal dust and infrequent renewals of plating promoter. The tertiary amides and amines when used in combination with organic carboxylic acids or fatty acids are also especially effective in aqueous systems, as has already been mentioned.

The properties of clean surfaces which enable one clean surface to weld or fuse to another are not limited to any one group of metals, or indeed to metals. A chemically clean and optically flat glass plate may be made to adhere strongly to a similar glass merely by pressing them together. Highly polished metal blocks may be made to adhere to one another. A clean glass surface may be bonded to a clean metal surface. Measurements of the force required to pull such surfaces apart runs, in many cases, to many tons per square inch. In powder metallurgy, different metal powders may be compressed at room temperature or at temperatures far below their melting points, and bonded together to form compacts.

In view of the above, the application of the principles set out previously to all metal powders makes it possible to plate any metal.

In practice, metals such as zinc, cadmium, tin and lead are readily built up into substantial coatings, while metals such as copper, silver, stainless steel, etc., etc., under similar circumstances, could at room temperature be applied only as a thin smeared on type of coating. I have found that these differences in behavior are tied in with the minimum recrystallization temperatures of the metals when in the dractically worked condition.

Consider the operation of a tumbling barrel or ball mill for the moment in which finely divided metal powders are acted upon by small metal shot in the presence of a suitable liquid and the objects which are to be plated. Mechanical work done in a mill operating under these conditions is sufficient to raise the internal temperature of the mill several degrees, and the local temperature at the point of impact between metal objects and shot may be substantially above room temperature. In view of this phenomenon, in the plating of zinc the temperature involved may be well above room temperature. In the case of drastically worked aluminum, this temperature may be reached in local areas at the point of impact. Thus, the plating of metals, such as zinc, lead, cadmium and tin, may proceed well above their minimum recrystallization temperatures without the application of externally applied heat. Aluminum, which has a higher recrystallization temperature (probably about 150° C.) falls in an intermediate zone. Light coatings of aluminum up to .003'' may be achieved in liquid media without the necessity for applying heat. Other metals having higher recrystallization temperatures must be raised in temperature so that plating is done above the minimum recrystallization temperature for the metal being plated.

Operation at temperatures well above the minimum recrystallization temperature frequently results in improved results and faster plating. Operation at above room temperatures are more suited to non-aqueous baths than to water containing mixtures.

In the plating of zinc in mills run at 150° F., it has been found possible to apply light coatings without zinc dust being introduced, the zinc for the reaction coming from the zinc-coated shot used and the zinc lining which builds up on the inner surfaces of the mill. Plating without zinc dust in this way results in the application of light coatings which are characterized by extreme smoothness and a very high degree of luster. A very suitable fatty acid for plating without zinc dust is caprylic acid. Analysis of the plating liquid discloses that a substantial quantity of zinc dissolves as a metal soap and it is possible that some of the zinc in the coating may be derived from a solution phase.

Where externally applied heat is used, as for example in the plating of copper or silver where both have minimum recrystallization temperatures of 200° C., it is necessary to use different carrier liquids and sometimes different plating agents. The carrier liquids described above do not have boiling points sufficiently high for use at 200° C., but other liquids, such as butyl stearate or tri-butyl phosphate are quite suitable. Other suitable liquids may be found in the light oils, such as whale oil, a purified version of which is sold commercially under the trade-name of Cosmol. For temperatures of 200° C., and higher, it is also possible to use materials which may be solid at room temperatures, but which are quite fluid at the operating temperature of the plating bath. Materials of this character are solid alcohols, such as the sterol alcohols, and some of the fats. A commercial product known as tin fat which is used in place of palm oil in the hot dipping of tin plates is also suitable as a carrier liquid for elevated temperature plating using this method. Several of the fatty acids are suitable for use at elevated temperatures. Stearic acid, which is less desirable for work at room temperature, works well at elevated temperatures. Oleic acid is also well adapted for use at higher temperature. Neutral fused salts are available as liquids for the plating of metals having higher recrystallization temperatures than copper and silver. Plating under pressure extends the range of some liquids. However the coating is derived, mechanical agitation, attrition or impact is present in all cases and is an essential part of the process.

I do not wish to be limited to any particular theory involving recrystallization of the grains, but I find that the recrystallization temperatures provide an exact guide as to the temperature required. The recrystallization temperatures may be the minimum given for any particular metal which has been drastically worked. It should be noted that in the practice of this invention conditions for the drastic working of the metal being applied are present. It is understood that recrystallization may occur over a wide range of temperature, starting, for example, with tin and lead which begin to recrystallize at room temperature, aluminum which begins to recrystallize at 150° C., and copper and silver which begin to recrystallize at 200° C., up through the lowest recrystallization temperature of other metals and alloys. Taking a specific example, such as zinc, it will be noted that it recrystallizes at room temperature. Room temperature is a variable quantity. Succesful zinc plating as has been stated may be achieved when the temperature is raised substantially above room temperature, but if the mill is cooled sufficiently far below room temperature, then no plating of zinc occurs. That is, therefore, exactly analogous to the case of copper which at room temperature is sufficiently below its recrystallization temperature that no plating occurs. Some alloys recrystallize at room temperature or below and many alloys have been plated at room temperature. This alloy plating includes both solid solution and two-phase alloys. For example, it is possible, using the methods of this invention, to take copper powder and zinc powder and to run them together in the mill with the proper liquids and the proper charge of shot so that yellow alpha brass is formed from these two different metal constituents. This yellow alpha brass appears as a bright adherent coating on the metal objects placed in the mill for plating. Other solid solutions have also been plated in a similar way at room temperature.

Plating at temperatures that fall near the minimum recrystallization temperature is done at heats far removed from the melting point of the metal being plated. Copper, for instance, has a minimum recrystallization temperature of about 200° C. The melting point of copper is 1083° C., so that plating may be accomplished at a temperature over 800° C. removed from the melting point. Other metals having higher recrystallization temperatures, such as iron (about 400° C.) have still higher melting points so that substantially the same temperature differential between plating temperature and melting point exists.

When plating at minimum recrystallization temperatures, no detectable diffusion of the plating metal into the base occurs. It is recognized that when plating with low melting point metals, it is possible that if the temperatures are raised high enough, some diffusion might result.

Zinc is an example of a metal that will diffuse into the base layer if the temperature is sufficiently high.

The following examples will serve to illustrate the practice of the invention:

EXAMPLES

EXAMPLE 1

When plating nails the following charge is satisfactory:

| | | |
|---|---|---|
| Metal dust to be plated (e. g. zinc) | lb | 5 |
| Nails | lb | 10 |
| Solvent (V. M. & P. Naphtha) | qt | 2 |
| Lubricant (oleic acid) | oz | 4 |

EXAMPLE 2

When plating screws the following is satisfactory:

| | | |
|---|---|---|
| Metal dust to be plated (e. g. zinc) | lb | 10 |
| Screws | lb | 7½ |
| Solvent (mineral spirits) | qt | 1½ |
| Lubricant (primary amine soya base) | oz | 4 |

EXAMPLE 3

When plating small metal parts:

| | | |
|---|---|---|
| Metal dust to be plated (e. g. zinc) | lb | 5 |
| Small metal parts for plating | lb | 3 |
| Metal balls (approx. ⅛'' diameter) | lb | 10 |
| Solvent (mineral spirits) | qt | 2 |
| Lubricant (oleic acid) | oz | 2 |

EXAMPLE 4

Three pounds zinc dust, twelve pounds of metal shot No. 1110, two quarts of high-flush naphtha and 100 cc. caprylic acid were added to a five quart porcelain laboratory jar, together with an assortment of washers and other small hardware which had been well pickled in acid and subsequently washed in boiling water. The jar and contents were then cooled with carbon dioxide to a temperature below minus 20° C. The mill after cooling was revolved for twelve hours in an insulated cabinet which was cooled by 150 pounds of solid carbon dioxide. At the expiration of this time the mill was opened and the objects therein were found to have no zinc plating on them.

EXAMPLE 5

A five quart laboratory jar was charged in exactly the same manner as that outlined in Example 4 above, and was rotated for twelve hours at room temperature. On opening the mill the objects were found to be coated with a bright lustrous dense coat of zinc metal which was four thousandths of an inch thick (.004'').

In Example 4 listed above, the zinc was below its recrystallization temperature and no plating occurred. In the fifth example, it was well within its recrystallization temperature range and heavy plating was obtained.

EXAMPLE 6

Three pounds of copper powder, together with twelve pounds of No. 1110 shot, plus two quarts of butyl stearate and 100 cc. of oleic acid were added to a five quart assay laboratory jar, together with an assortment of pickled objects. This mill was closed and operated for twelve hours at room temperature. On opening it was found that the objects had received no copper coating or the lightest trace of copper discoloration.

EXAMPLE 7

A five quart laboratory assay jar was charged in exactly the same way as for Example 6 and run in an insulated cabinet at a temperature of 250° C. After six hours of running, the mill was opened and the objects within were found to be coated with a bright dense coating of copper .0005'' thick.

In Example 6 the copper was run at a temperature below its recrystallization range and no plating occurred. In Example 7 it was run at a temperature within its range, and a substantial coating was laid down.

EXAMPLE 8

300 pounds of iron shot No. 1110 were added to a mill 18'' in diameter and 30'' long, together with 50 pounds of finely divided zinc dust and seven gallons of high-flash naphtha and two quarts of oleic acid, plus seventy-five pounds of assorted metal objects which had been well pickled. The first objects which were removed from this mill had a coating of .0015'' after ten hours of operation. Fresh objects were added to replace those removed. These were removed after a further period of ten hours when a third batch was added and it was found that after four or five batches had been removed that the weight of coating had fallen to one ten-thousandth of an inch. In other words, little more than a flash coating was achieved.

EXAMPLE 9

The mill described in Example 8 was loaded in exactly the same manner with the same charge and the same weight of objects, but was run at a temperature of 60° C. At this temperature the mill kept on plating and the weight of coating was not reduced even when the mill was kept in operation for twenty-eight days. Fresh additions of plating agent once a week were made along with small fresh additions of zinc dust.

It will be noted in Example 8 that the fatty acid did not continue to plate when run at room temperature, but that in Example 9 at a temperature further into the recrystallization range of the zinc caused continuity of plating of the fatty acid.

The objects referred to in the examples above may be the washers mentioned or screws, bolts, nuts, nails, etc., or any other objects or articles regardless of size or shape.

EXAMPLE 10

A laboratory jar of five quart capacity was charged with three pounds of silver powder and twelve pounds of iron shot No. 1110. 100 grams of oleic acid were added together with two quarts of high-flash naphtha and an assortment of small washers and other hardware which had been well pickled. The mill was rotated at room temperature for twelve hours. No plating of silver occurred.

EXAMPLE 11

Three and one-half pounds of silver dust, twelve pounds of iron shot No. 1110 were added to a five and one-half quart laboratory mill together with two quarts of butyl stearate and 100 grams of stearic acid. The mill was operated at 250° C. for five hours. Upon opening, the washers and other assorted objects were found to be covered with a dense silver coat 1.5 thousandths of an inch.

In the case of Example 10 the silver was below its recrystallization temperature and no plating occurred, whereas in Example 11 it was within the recrystallization temperature range and a thick coat of silver was deposited.

EXAMPLE 12

A small five quart laboratory jar was charged with three pounds of zinc powder, twelve pounds of shot No. 1110, two quarts of butyl stearate, 100 grams of stearic acid and an assortment of small hardware. The mill was closed and rotated for four hours at a temperature of 125° C. Upon opening, the objects were found to be coated with 2.5 thousandths of an inch of zinc. The coating obtained in this way was very ductile and would stand very substantial deformation; in some cases sufficient to rupture the steel base without injury to the coating. Photomicrographs were made of the coating and they showed no diffusion of the zinc into the steel.

EXAMPLE 13

A similar charge run under exactly identical conditions to Example 9 above was made except that the temperature was maintained at 200° C. The adhesion of this coating was not as good as that in Example 12. Photomicrographs of the coating showed sporadic and barely perceptible indications of diffusion into the base metal.

EXAMPLE 14

A charge similar to Example 13 above, but run at 225° C. was made. The adhesion of this coating to the base was poor. The photomicrographs indicated a definite diffusion of the zinc into the steel with formation of a definite alloy layer which is clearly visible.

From these last examples it will be seen that the temperature can be carried almost half-way to the melting point of zinc without the formation of any alloy layers and with excellent ductility. When the temperature is carried still higher, then alloying may occur.

From these examples it will be seen that the base temperature range for the plating of zinc may vary from 15° C. to 200° C., but above this temperature other effects such as alloying will occur.

EXAMPLE 15

Into a five quart laboratory jar was charged two pounds of nails which had been well pickled and washed, and ten pounds of coarse mesh zinc dust to serve as impacting medium, and 1200 cc. of water containing 2% of plating chemicals composed of a three to one mixture containing three parts of caprylic acid to one part of a tertiary amine highly solubilized with ethylene oxide. One quarter pound of dust was added to provide the metal for the coating. The mill was closed and agitated for three hours. On opening the nails were found to be coated with a bright adherent coat of zinc of .002'' in thickness. In this example the tertiary amine served as the cationic wetting agent referred to in the specification of application No. 14,639.

EXAMPLE 16

A five quart jar mill was charged as above, the organic amine being replaced by a tertiary amide. On opening the mill after three hours' agitation, a bright adherent coating .002'' was found to have been plated on the nails.

In this example the tertiary amide acted in a similar manner to the tertiary amine of the previous example and filmed the zinc dust thereby protecting it from the action of the carrier liquid water.

EXAMPLE 17

Into a mill 30'' in diameter and one foot long was charged 550 pounds of coarse zinc grit, fifteen pounds of fine zinc dust, 150 pounds of well pickled and washed nails, and nine gallons of water. In the nine gallons of water was dissolved 700 cc. of a mixture containing three parts of a highly solubilized tertiary amide derived from a long chain unsaturated fatty acid (and similar to the one used in the preceding example) and one part of caproic acid. The mill was closed and agitated for three hours at a twenty-five R. P. M. On opening the mill the nails were found to be covered with a bright adherent coating of zinc approximately .00175'' thick.

To summarize:

This invention involves the joining of the metal surfaces of the article and the particles by bringing their surfaces into such actual physical metal to metal contact that atomic forces of attraction cause the surfaces to weld together by attachment of the particles to the articles and to each other.

This is accomplished by using very small particles of metal for the coating and applying a force to distort each small particle individually and interfit it into place in the coating. The application of the force necessary to distort and interfit the particles may be achieved in various ways. One preferred way is to tumble the articles either alone or with crushed iron shot, nail whiskers or other suitable hard material. Other ways, such as by projecting the metal coating particles suspended in a liquid vehicle containing the plating promoters at the articles to be coated by means of an impeller or wheel, have been successfully used.

Any other system capable of individually distorting the small metal particles and welding and interfitting them into place on the surfaces of the articles to be coated and to each other could be successfully used without departing from the scope or purpose of this invention.

It has been shown that two degrees of plating are involved in the mechanical process of metal cladding the surfaces of metals, using finely divided metal dusts to provide the coating metal. These are the adhesive coatings laid down into the microscopic roughnesses of the base surfaces and the cohesive bond where other particles are superimposed on the initially deposited layers.

It has been shown that the prior art has not been able to achieve any coating other than a smear type of adhesive coating, whereas this disclosure shows means for building up adherent coatings of any desired thickness.

It has been shown further that this is accomplished in a very surprising manner, namely by filming the surfaces of the articles and particles with a thin oily film, which film is preferably capable of exerting a solvent action on metal oxides to assist the mechanical forces in securing clean metal surfaces in addition to its property of filming metals. Where the film former does not have any solvent or oxide removal properties of its own, it can be fortified by additions which do have such action, such as weak acids like some of the organic acids—such as citric, tartaric, oxalic, or weak alkalis, such as dilute solutions of ammonia.

In the various illustrative examples and in the specification, various oily film-forming materials such as the fatty acids, reaction products of fatty acids with nitrogen, cellulose gum, etc. have been disclosed. It is obvious that of the thousands of old and new oily film formers now on the market, others may be used without departing from the spirit of this invention which teaches that an oily material is useful in promoting the joining of metal surfaces. This is entirely new and novel.

Similarly, in the examples and specification, various acids and alkalis such as citric, caprylic, acetic, and weak ammonia have been disclosed for use in facilitating the removal of oxide and other films from the surfaces of the metals to be joined. It is obvious that other weak organic acids having similar properties may be substituted with more or less efficiency for these mentioned without departing from the spirit of this invention.

I claim:

1. A method of cladding metal articles with a metal selected from the group consisting of tin, lead, cadmium, zinc, aluminum, magnesium, copper, silver, gold and alloys thereof, which method comprises mixing said articles (with pieces of impacting material in a liquid carrier *with impacting material selected from the group consisting of said articles and pieces of impacting material, said liquid carrier* containing particles of said selected metal in amount sufficient to provide a desired thickness of cladding metal on said articles and in proportion ranging from $^1/_{480}$ to 4/3 of the combined weight of said articles and impacting material, said carrier liquid being in amount between .143 and 100 of the weight of the metal dust particles and including dispersed therein an organic surface-active, film-forming compound unreactive with said carrier liquid and selected from the group consisting of the fatty acids of 6 to 22 carbon atoms and the amines and amides of said acids, said compounds being present in amount in the range of the order of .7 to .001 of the carrier liquid by weight and at least sufficient to substantially cover said articles and to enclose and protect the powder particle surfaces with molecularly thin films, forcibly impacting and rubbing said film-coated dust particles in admixture in said carrier liquid onto the surfaces of said articles to flatten said particles and rupture said films and bring the particles in metal to metal contact with the said surfaces and with each other, the temperature of the treating carrier liquid being at least equal to the minimum temperature of recrystallization of the said metal particles to clad said surfaces with adherent surface layers of said flattened particles with entrapment of residual inclusions of said film-forming compound retained in random distribution among said flattened particles of said cladding layer, and continuing said impacting and rubbing of said film-coated particles onto said adherent surface layers to build up said surface layers to desired thickness on said articles.

2. A method of mechanically cladding metal articles as set forth in claim 1 in which the carrier liquid is a non-aqueous organic compound which is a liquid solvent for the film-forming material.

3. A method of mechanically cladding metal articles as set forth in claim 1 in which the carrier liquid is aqueous and holds the film-forming material in solution therein.

4. A method of mechanically cladding metal articles as set forth in claim 1 in which the carrier liquid is aqueous and contains the film-forming material dispersed as an emulsion therein.

5. A method of mechanically cladding metal articles as set forth in claim 1 in which the carrier liquid is aqueous and includes the film-forming material and a weak water-soluble organic carboxylic acid acting to dissolve oxides from the surface of the metal particles, said material and said acid constituting together .7 to .001 of the carrier liquid by weight.

6. A method of mechanically cladding metal articles as set forth in claim 1 in which the film-forming material is an aqueous solution of a tertiary amide of one of the said fatty acids.

7. A method of mechanically cladding metal articles as set forth in claim 1 in which the carrier liquid includes the film-forming compound and an organic acid selected from the group consisting of tartaric, citric, caproic, and caprylic and acetic acids constituting together with the film-forming material .7 to .001 of the carrier liquid by weight.

8. A method of mechanically cladding metal articles as set forth in claim 1 in which the carrier liquid is water and includes the film-forming compound and a weak alkali to effect the dissolving of the oxides from the surfaces of the metal particles, the film-forming compound and weak alkali together constituting .7 to .001 of the carrier liquid by weight.

9. A method of mechanically cladding metal articles as set forth in claim 1 in which the carrier liquid is water and includes the film-forming compound and ammonia to effect the dissolving of the oxides from the surfaces of the metal particles, the film-forming compound and ammonia together constituting .7 to .001 of the carrier liquid by weight.

10. A method of cladding metal articles as set forth in claim 1 in which the film-forming material is an aqueous solution of a tertiary amine of one of the said fatty acids.

11. A method of cladding metal articles as set forth in claim 1 in which the coating metal particles are copper.

12. A method of cladding metal articles as set forth in claim 1 in which the coating metal particles are silver.

*13. A method of cladding metal articles as set forth in claim 1 in which the impacting material is provided by pieces of material different from the material of said articles.*

*14. Method of cladding metal articles as set forth in claim 1 in which the said articles serve as their own impacting material.*

References Cited in the file of this patent or the original patent

UNITED STATES PATENTS

| Number | Name | Date |
|---|---|---|
| 2,375,315 | Mixon | May 8, 1945 |

FOREIGN PATENTS

| Number | Country | Date |
|---|---|---|
| 534,888 | Great Britain | Mar. 21, 1941 |